Feb. 17, 1942.   R. G. CAMPBELL ET AL   2,273,624
APPARATUS FOR REMOVING WELD FLASH FROM SHEET METAL
Filed July 17, 1939    3 Sheets-Sheet 1
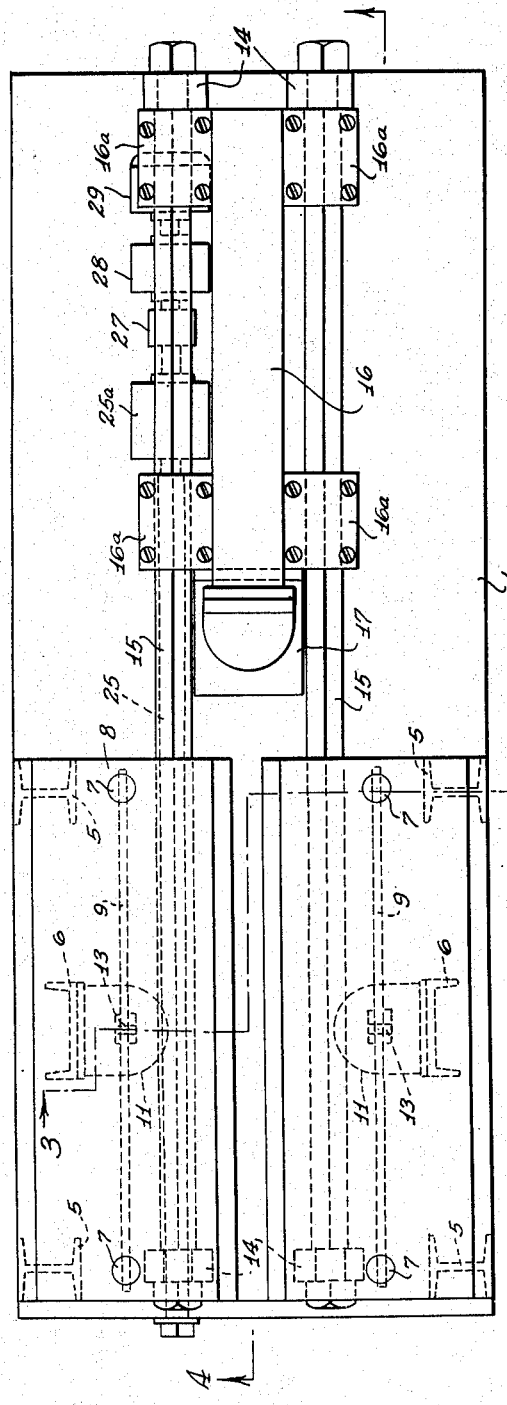
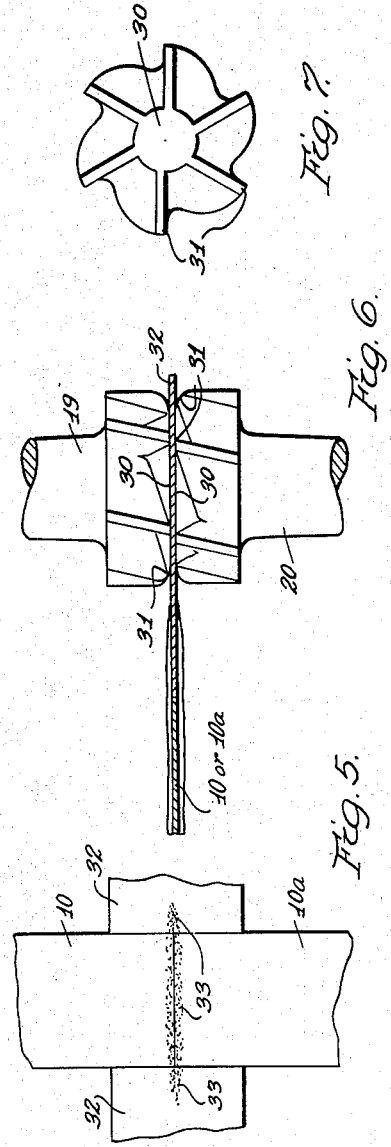
INVENTORS
Rolla G. Campbell
Donald B. McLouth
BY J. Windsor Davis
ATTORNEY.

Feb. 17, 1942.   R. G. CAMPBELL ET AL   2,273,624
APPARATUS FOR REMOVING WELD FLASH FROM SHEET METAL
Filed July 17, 1939   3 Sheets-Sheet 2

INVENTORS
Rolla G. Campbell
Donald B. McLouth
BY J. Windsor Davis
ATTORNEY.

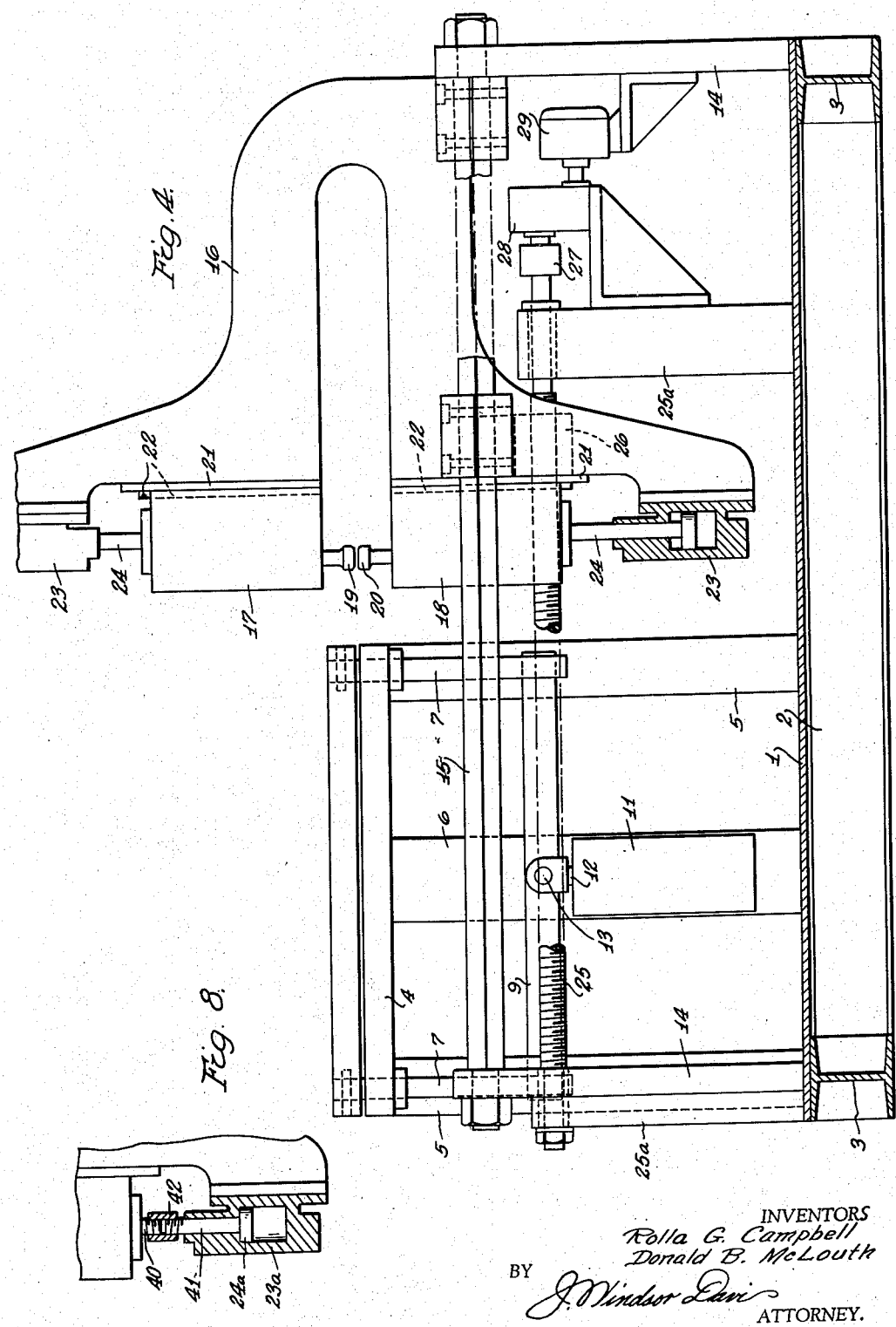

UNITED STATES PATENT OFFICE 2,273,624

APPARATUS FOR REMOVING WELD FLASH FROM SHEET METAL

Rolla G. Campbell and Donald B. McLouth, Detroit, Mich., assignors to McLouth Steel Corporation, a corporation of Michigan Application July 17, 1939, Serial No. 284,846

8 Claims. (Cl. 90—15)

This invention relates to method and apparatus for removing the excess thickness of metal such as is formed by a weld joining two pieces of sheet metal together and has for its primary object to provide apparatus of this character embodying end mill cutters arranged and actuated to simultaneously operate on opposite sides of the weld to reduce the thickness thereof to correspond to the thickness of the stock united by the weld.

Another object is to provide a machine embodying means for accurately positioning the end mills in order that the thickness of the weld and the metal immediately adjacent thereto will exactly correspond to the thickness of the joined stock. In this respect, prior to the welding operation the pieces of stock to be welded are trimmed by removing sections therefrom in order to provide straight and accurately butting edges. The two straight edges are held together and the sections removed to straighten the edges are placed alongside the stock at opposite ends of the joint. The weld is then made in such manner that it extends the entire width of the stock and into but not completely through the sections placed alongside thereof. The end mills have gauge or pilot portions in the same plane as their cutting edges, and are arranged above and below the plane of the stock to be welded. The gauge or pilot portions of the end mills are placed in pressure contact with an unwelded portion of one of the sections alongside the stock, with each end mill opposing the thrust of the other, and are thus spaced apart a distance exactly equal to the thickness of the stock. The cutters are then caused to traverse the stock and the cutting edges remove all metal in the path thereof, which will only be metal of a thickness in excess of the normal thickness of the stock.

Another object is to provide a method of removing the excess thickness of metal formed by welding two pieces of stock together which consists in removing a section from the stock and utilizing it as a gauge for spacing cutting tools.

Another object is to provide an end mill having a gauge or pilot portion located in the same plane as the cutting edges thereof. By holding the pilot portion in pressure contact with a work piece and causing the tool to traverse the work piece, the mill will remove all metal higher than the plane of the original setting of the tool. The bearing portion permits the application of pressure on the mill without such pressure being brought to bear on the cutting edges thereof. An important advantage results from the use of a mill so constructed in that it avoids the necessity of apparatus for accurately positioning it with respect to the work while it traverses the work.

Another object is to provide means for holding the stock while the cutters are operating thereon. In this respect spaced sets of table and hold down plates securely hold the stock against movement, in close proximity to the path of the cutters, so as to avoid deflection of the stock when the cutters are pressed into engagement therewith, and in such manner as to enable the cutters to traverse the stock and simultaneously remove metal from both sides thereof.

In the manufacture of various articles from sheet metal by automatic machinery the stock usually is of rolled form, and the length of the stock is of course dependent upon the size of the roll. When a roll has been completely used a new strip must be threaded through the machine which is an operation sometimes requiring more than half an hour. During this time the machine must remain idle, and by welding the end of another roll to the end of the exhausted roll a material saving may be obtained, providing the weld has a thickness exactly corresponding to the original thickness of the stock. Various methods of removing the excess thickness of metal at the weld have heretofore been used and their accuracy is no greater than the type of tool employed. The most common example probably is grinding, in which case accurate setting of the tool must take into consideration wear on the tool. An important object of this invention is to eliminate this consideration.

With end mill cutters constructed according to this invention wear also occurs radially, but inasmuch as their travel is in a plane radial with respect to their axes, wear does not affect accuracy.

Other objects and advantages will become more fully apparent as reference is had to the accompanying drawings wherein our invention is illustrated, and in which:

Fig. 1 is a top plan view of the machine,

Figures 2, 3:
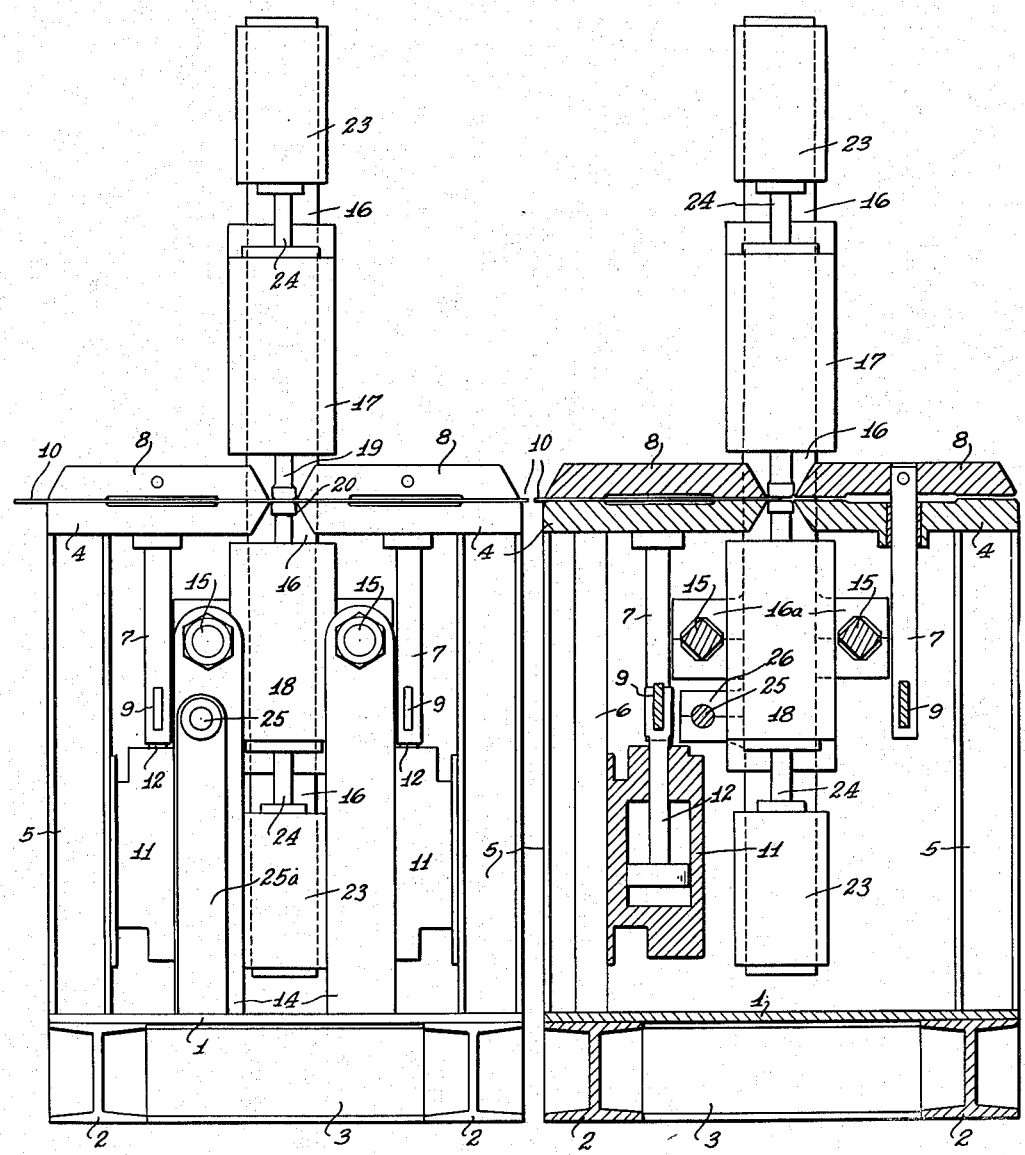
Fig. 2 is an end elevation.

Figs. 3 and 4 are sections taken respectively on lines 3—3 and 4—4 of Fig. 1,

Fig. 5 is a view illustrating the condition of the work piece prior to machining thereof, Fig. 6 is a view showing the relationship of the cutters with the work piece, Fig. 7 is an end view of one of the cutters, and Fig. 8 illustrates an adjustable connecting rod.

More particularly, 1 designates the base plate of the machine which is supported upon longitudinal H-beams 2 and transverse H-beams 3. Two parallel table plates 4 are supported above the base plate 1 by vertical H-beam table supports 5 located at the ends of the table plates, and by vertical channel members 6 located midway between respective pairs of table supports 5. The table plates 4 are thus rigidly mounted with respect to the base plate 1.

Adjacent each end of each table plate is a vertically slidable rod 7. The upper ends of the pair of rods 7 thus provided in each table plate are connected to a hold down plate 8, and the lower ends of each pair are interconnected by a cross member 9. A strip 10 of sheet metal rests upon the table plates 4, and the hold down plates may be pulled downwardly by respective pairs of rods 7 to clamp the sheet metal against movement. To actuate the hold down plates a hydraulic ram 11 is mounted on each of the vertical channels 6, and the rams have their connecting rods 12 connected to respective cross members 9 as indicated at 13. The rams 11 are standard hydraulic double acting piston and cylinder units obtainable in the market and, therefore, it is deemed unnecessary to illustrate the control system therefor.

From the foregoing it becomes apparent that a strip of sheet metal may be passed between the two table plates and their respective hold down plates, and that the strip may be stopped and clamped at any desired point in its length. The above fixture is here illustrated in conjunction with flash removing means in which case the strip is stopped with its joint flash between the edges of the parallel table plates, and the flash removing tools traverse the strip by movement between adjacent sets of table and hold down plates. It is pointed out, however, that although the invention is primarily concerned with the removal of a weld flash, the clamping fixture above described may be used to hold adjacent ends of an interrupted strip to enable welding of the ends together.

Supported by brackets 14 at opposite ends of the base plate are two parallel ways 15. A tool carriage 16 has laterally extending bearing blocks 16a slidably received on respective ways 15 and supporting the carriage 16 for sliding movement. End mill units 17 and 18 each embodying a housing containing an electric motor for operating their respective end mill cutters 19 and 20 are slidably mounted in opposed relation on plates 21 secured to the carriage 16. The mounting may be of the dovetail slide and guide type indicated at 22.

To move the milling units 17 and 18 toward and away from each other hydraulic rams 23 are mounted on the carriage and are connected to respective units 17 and 18 by connecting rods 24. The rams 23 are standard hydraulic double acting piston and cylinder units obtainable on the market and it is deemed unnecessary, therefore, to illustrate the controls therefor.

The ways 15 and milling units 17 and 18 are so arranged that sliding movement of the carriage carries the cutters 19 and 20 between the the spaced sets of table and hold down plates 4 and 8, for contact of the cutters with the strip 10. To cause this sliding movement of the carriage a feed screw 25 is rotatably mounted in longitudinally spaced supporting members 25a and an internally threaded block 26 on the carriage engages the screw. One end of the screw 24 is connected by a flexible coupling 27 to a gear reduction unit, generally designated 28, which is operated by an electric motor 29.

The end mill cutters 19 and 20 are of special design, as shown more clearly in Figs. 6 and 7. Each end mill cutter has a centrally or axially arranged bearing surface 30 disposed in the same plane as the radially disposed cutting edges 31, and constituting a gauge or pilot, as will hereinafter appear.

Fig. 5 illustrates the method of welding the strip stock, and shows the butted ends of two strips 10 and 10a welded together at 33, with pieces 32 of stock forming lateral extensions at each side thereof at the ends of the joint. The extensions 32 are composed of pieces of stock having the same thickness as the strip stock to be welded, preferably being pieces removed from the ends of the strips 10 and 10a prior to the welding operation. Short lengths or pieces are cut from the ends of strips to be welded in order to straighten the edges and provide an accurate butt, and the pieces 32 which are so removed are subsequently placed alongside the joint between the two strips at the time the weld is made. The weld 33 extends completely through the strip stock and into the pieces 32, but not completely through at least one of the pieces 32.

In operating the present machine, the weld joint such as above described is disposed between the spaced sets of table and hold down plates, and the rams 11 are operated to move the hold down plates 8 into firm contact with the strips 10 and 10a and with the laterally extending pieces 32. Due to existence of only sufficient space between the two sets of table and hold down plates 4 and 8 to accommodate the cutters 19 and 20, the amount of strip and extension piece stock which is unsupported is comparatively small, and the possibility of deflection of the unsupported stock when the cutters are pressed into contact therewith is reduced to a minimum. The carriage is then moved to position the milling units above and below the unwelded portion of one of the sections 32, the rams 23 are then operated to cause pressure contact between the end mill cutters 19 and 20 and the upper and lower surfaces of the piece 32, between the two sets of table and hold down plates 4 and 8. Inasmuch as the piece 32 is of the same thickness as the strip stock being treated (previously being a part thereof) contact of the gauge or pilot portions 30 therewith sets the cutting edges 31 of the cutters 19 and 20 a distance apart which is exactly equal to the strip 10. As the cutters are caused to traverse the strip through movement of the carriage 16 by the feed screw, all metal in excess of the thickness at which the cutters are initially set is removed.

The rams 23 press the gauge or pilot portions 30 of the cutters 19 and 20 into engagement with opposite sides of the strip stock, and therefore each cutter opposes the thrust of the other. The two rams 23 are adapted to exert approximately equal pressure, although a variation in the pressure exerted will have no detrimental effect unless one exceeds the other to such an extent that it causes deflection of the sheet stock. Deflection is avoided by clamping the strip stock firmly while leaving but a comparatively small amount thereof unsupported, and therefore the rams require no positive positioning means. The sole purpose of the rams 23 is to hold the gauge or pilot portions 30 in firm contact with the strip stock, and to retract the cutters on the return stroke. The gauge or pilot portions 30, through contact with the strip stock, provide proper guidance of the cutters.

In some cases it might be found desirable to provide means which will positively position the end mill cutters, in a definitely spaced relation, so that separation thereof will not take place as a result of vibration etc. Means for accomplishing this is shown in Fig. 8 and comprises a two part connecting rod composed of the parts 40 and 41, and adapted to be substituted for the connecting rods 24. The two connecting rod parts 40 and 41 have opposite screwthreads on their adjacent ends, and an internally threaded collar 42 connects the two parts by engaging said oppositely screwthreaded ends. By manually rotating the sleeve in one direction the connecting rod is lengthened, and by rotating it in the other direction it is shortened.

Sufficient fluid pressure is supplied to the cylinder 23a to cause the piston 24a to move into engagement with the end of the cylinder. At this time the sleeve 42 is rotated to position the end mill cutter 19 or 20, as the case may be, into engagement with the stock. Fluid pressure sufficient to maintain this contact is supplied to the cylinder while the cutter traverses the stock.

What is claimed is:

1. In combination, means for holding a work piece, a pair of end mills in opposed coaxial relation, said mills having axially disposed bearing surfaces in the same plane as their cutting edges, and means supporting said mills for simultaneous traversal from one edge to the other of opposite sides of the work piece with the bearing surfaces in contact with the work piece.

2. In combination, means for holding a work piece, a pair of end mills in opposed coaxial relation, said mills having axially disposed bearing surfaces in the same plane as their cutting edges, means supporting said mills for simultaneous traversal from one edge to the other of opposite sides of the work piece, and fluid pressure means for maintaining said bearing surfaces in pressure contact with said work piece.

3. In sub-combination, a work piece holder, an end mill having an axially disposed bearing surface in the same plane as its cutting edges, and means supporting the end mill for traversal from one edge to the other of the work piece with the bearing surface in contact with the work piece.

4. In sub-combination, a work piece holder, an end mill having an axially disposed bearing surface in the same plane as its cutting edges, means supporting the end mill for traversal from one edge to the other of the work piece, and yielding means for holding said bearing surface in pressure contact with the work piece.

5. In combination, a work piece holder, a carriage mounted for movement relative to the holder, a pair of end mills mounted on said carriage in opposed relation, means for moving said carriage to cause said mills to traverse opposite sides of work piece in the holder from one edge of the work piece to its other edge, and means on said carriage for forcing the end mills into pressure contact with opposite sides of the work piece, said mills having axially disposed bearing surfaces in the same plane as their cutting edges and being arranged coaxially whereby each opposes the thrust of the other.

6. In combination, means for holding a work piece, a pair of opposed cutters, fluid pressure means for moving the cutters toward opposite sides of said work piece, and adjustable means for positioning the cutters with respect to said work piece.

7. In combination, means for holding a work piece, a pair of opposed cutters, fluid pressure means for moving the cutters toward opposite sides of said work piece, said fluid pressure means having a predetermined travel toward the work piece and being held at the limit of their travel by the fluid pressure, and lengthwise adjustable means connecting the cutters with said fluid pressure means.

8. In combination, means for holding a work piece, a pair of tool units supported on opposite sides of the work piece for movement toward and away from the work piece, fluid pressure means each having a definite limit of travel toward the work piece, and adjustable connections between the tool units and respective fluid pressure means enabling adjustment of the tools into contact with the work when said fluid pressure means are at said limits of travel.

ROLLA G. CAMPBELL.
DONALD B. McLOUTH.